May 7, 1957    F. W. MURPHY ET AL    2,791,393
GAS SHUT OFF VALVE
Filed July 14, 1954    2 Sheets-Sheet 1

INVENTORS
F. W. Murphy
A. C. Murphy
BY Kimmel & Crowell
ATTORNEYS

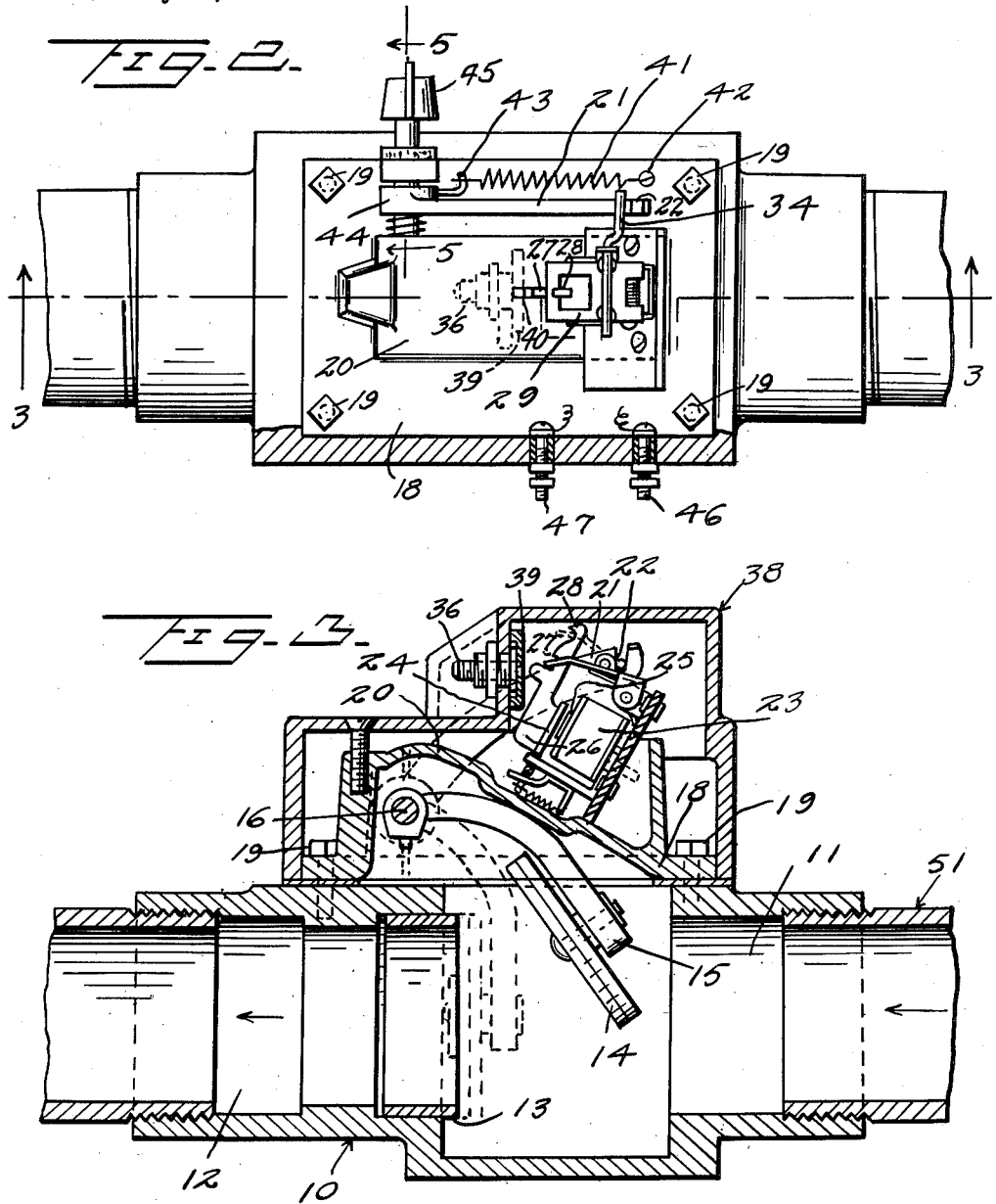

United States Patent Office 2,791,393
Patented May 7, 1957

2,791,393
GAS SHUT OFF VALVE

Frank W. Murphy and Arthur C. Murphy, Tulsa, Okla.

Application July 14, 1954, Serial No. 443,228

4 Claims. (Cl. 251—68)

This invention relates to an automatically operable fuel cut off valve for stationary engines.

In stationary engines which operate from gas when the engine temperature exceeds a predetermined maximum it is desirable that the engine be stopped before damage results to the engine. As the stationary engines usually have a magneto in the ignition system the engine can be automatically stopped by use of a safety switch such as a switch similar to the one disclosed in my prior Patents No. 2,358,729, issued September 19, 1944, No. 2,467,333, issued April 12, 1949, or in my prior Patent No. 2,532,182, issued November 28, 1950. While these safety switches will effectively stop the engines when the temperature in the cooling or lubricating systems exceeds a predetermined maximum, the gas fuel line to the engine is left open, and if carbon should be present in the engine head and this carbon should be in a glow or burning condition, the engine will continue to run.

It is, therefore, an object of this invention to provide in combination with a safety switch shown in either of my prior patents, supra, a fuel cut off valve having an electrically operated release latch which normally holds the fuel valve plug in open position, and which upon closing of the safety switch will release the valve plug and the spring normally urging the plug to closed position will operate to close the valve.

With the above and other objects in view, my invention consists in the arrangement, combination and details of construction disclosed in the drawings and specification, and then more particularly pointed out in the appended claims.

In the drawings:

Figure 2 is a plan view, partly broken away and in section, of the valve latching and release mechanism with the valve in closed position.

Figure 3 is a sectional view taken on the line 3—3 of Figure 2 with the valve in open position.

Figure 1:
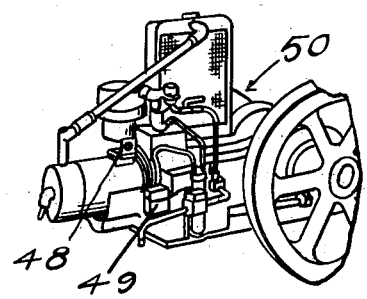
Figure 1 is a fragmentary perspective view of a stationary gas operated engine having a safety cut off valve interposed in the fuel line.

Referring to the drawings, the numeral 10 designates generally a valve housing formed with an intake port 11 and an outlet port 12.

A valve seat 13 is disposed between the ports 11 and 12 and a valve plug 14 carried by a lever 15 is adapted, when in the closed position thereof, to engage the seat 13. Lever 15 is secured to a shaft 16 journalled in bearings 17 carried by a removable top wall 18 secured by fastening means 19 to the upper portion of the housing 10.

Figure 4:
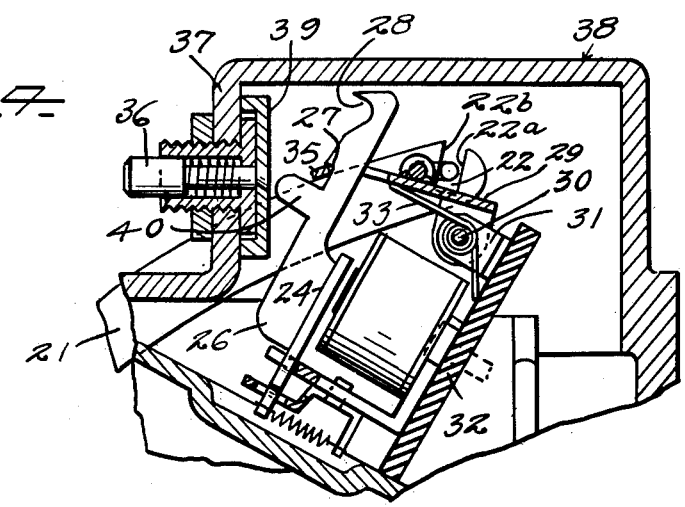
Figure 4 is an enlarged fragmentary sectional view of the electrically operated latch release means.
Figure 5:
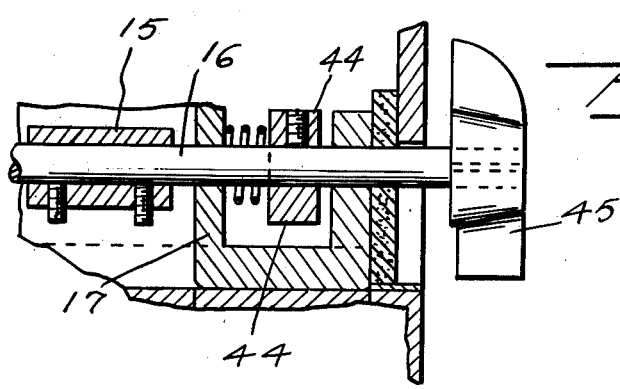
Figure 5 is a fragmentary sectional view taken on the line 5—5 of Figure 2.

The top wall 18 is formed with an offset 20 within which the lever 15 is situated. Shaft 16 has fixed thereto a latching lever 21 which is longitudinally curved, as shown in Figures 3 and 4, and is provided adjacent the free end thereof with a keeper notch 22.

An electrically operated relay, generally indicated at 23, is secured to the wall 18 and includes an armature 24 disposed in confronting position to a core 25. A latching member 26 is fixed to the armature 24 and projects upwardly therefrom being formed with a pair of keeper notches 27 and 28.

A keeper 29 is mounted on a shaft 30 carried by a pair of ears 31 fixed to an insulated base 32. The keeper 29 engages about the upper portion of the latching member 26 and is constantly urged upwardly by means of a coil spring 33 mounted on the shaft 30.

The keeper 29 has fixed thereto a locking member 34 which is disposed in the path of the movement of latching lever 21 and engages in the keeper notch 22 when lever 21 is raised upwardly to a valve 14 opening position.

When lever 21 is raised upwardly, locking member 34 is engaged by the side 22a of the notch 22 which functions as a cam to cause the locking member 34 to move forwardly and downwardly swinging keeper 29 at the same time therewith so that the keeper 29 will rock downwardly at its forward end so that locking bar 35 formed thereon will engage in the lower notch 27 of latch member 26. The side 22b of notch 22 in the lever 21 engages the locking member 34 and is supported thereby as long as the keeper 29 engages the notch 27.

A spring-pressed plunger or button 36 is carried by the front wall 37 of a cap 38, and plunger 36 has a plate 39 fixed to the inner end thereof which upon inward movement of plunger 36 engages a forwardly projecting lug 40 carried by the latching member 26, moving the latching member 26 to release the keeper 29 and hence the latching lever 21. Plunger 36 provides a means whereby valve 14 may be manually released for closing.

A tension spring 41 is fixed as at 42 to the plate 18 and is connected at its other end to an arm 43 carried by the inner end or bushing 44 of latching lever 21.

The spring 41 will bias the lever 21 in a clockwise direction as viewed in Figure 3 of the drawings.

A knob 45 is fixed to the outer end of shaft 16 and is disposed outwardly of cap 38 so that valve member 14 may be moved to open position when knob 45 is manually adjusted. Rotation of the knob 45 causes latching lever 21 to be raised upwardly to engage locking member 34 carried by the keeper 29.

In the use and operation of this valve structure, the terminals 46 and 47 are connected, respectively, to the safety switch structure 48 and the magneto 49 mounted on the engine 50.

In the event the engine 50 becomes overheated by lack of water in the cooling system or lack of oil in the lubrication system, safety switch 48 will, as disclosed in my prior patents, supra, ground magneto 49 so as to thereby cut off the ignition system from the spark plugs in the engine 50.

At the same time that the magneto 49 is grounded by closing of a grounding circuit through safety switch 48, relay 23 will be energized and armature 24 will be drawn toward core 25. Latch member 26 will thereupon release keeper 29 which will move upwardly carrying locking member 34 up out of the notch 22 in lever 21, and lever 21 will be released so that valve lever 15 will be swung downwardly or to the left, as viewed in Figure 3, under tension from spring 41 to valve 14 closing position.

The fuel line 51 will thereby be cut off from supplying fuel to the engine carburetor so that in the event there is any carbon glowing or burning in the engine cylinder, or cylinders, the burning or glowing carbon will not be able to burn the fuel and cause continued operation of the engine.

What is claimed is:

1. A shut-off valve comprising a housing formed with an inlet and an outlet port, a valve seat between said ports, a valve plug, a lever fixed at one end to said plug, a shaft rotatably carried by said housing and fixed to the other end of said lever, a latching lever fixed at one end to said shaft, said latching lever being provided with a notch adjacent the opposite end thereof, a locking member pivotally mounted in said housing and adapted for engagement in said notch for locking said latching lever in valve open position, latch means in said housing engaging said locking member for holding said locking member in engagement with said latching lever in said valve open position, means normally urging said locking member out of engagement with said latching lever, energizable electro-magnetic means adjacent said latch means for moving said latch means for releasing said locking member whereby said latching lever is released, and a spring engaging said latching lever for normally urging said valve plug to closed position.

2. A device as claimed in claim 1 in which said latch means includes an armature for said electro-magnet.

3. A device as claimed in claim 1 in which said latch means includes a notched arm for engaging said locking member.

4. A device as claimed in claim 1 in which said valve is provided with manual means for moving it to open position and manual means for releasing said latching means.

References Cited in the file of this patent
UNITED STATES PATENTS

| | | |
|---|---|---|
| 1,145,703 | Raymaker | July 6, 1915 |
| 1,638,052 | Moore | Aug. 9, 1927 |